US006959960B2

(12) United States Patent
Buccinna et al.

(10) Patent No.: US 6,959,960 B2
(45) Date of Patent: Nov. 1, 2005

(54) SEATING AND CARGO SYSTEM FOR A VEHICLE

(75) Inventors: Antonio Buccinna, Livonia, MI (US); Richard Hong, Grosse Pointe Woods, MI (US)

(73) Assignee: Johnson Controls Technology Company, Holland, MI (US)

( * ) Notice: Subject to any disclaimer, the term of this patent is extended or adjusted under 35 U.S.C. 154(b) by 31 days.

(21) Appl. No.: 10/493,629

(22) PCT Filed: Nov. 7, 2001

(86) PCT No.: PCT/US01/51648

§ 371 (c)(1),
(2), (4) Date: Apr. 23, 2004

(87) PCT Pub. No.: WO03/039935

PCT Pub. Date: May 15, 2003

(65) Prior Publication Data

US 2004/0239137 A1 Dec. 2, 2004

(51) Int. Cl.⁷ .......................... B62C 1/06; B62D 33/06; B60N 2/36
(52) U.S. Cl. ............... 296/190.11; 296/26.11; 296/69
(58) Field of Search ............... 296/63, 65.01, 296/66, 67, 65.05, 65.09, 65.16, 69, 26.11, 26.08, 190.11, 190.01, 57.1, 37.6

(56) References Cited

U.S. PATENT DOCUMENTS

| 3,169,792 A | | 2/1965 | Viquez |
| 4,475,576 A | | 10/1984 | Simon |
| 4,480,868 A | | 11/1984 | Koto |
| 4,527,828 A | * | 7/1985 | Groce et al. ............. 296/65.09 |
| 4,750,778 A | | 6/1988 | Hoban |
| 4,771,507 A | | 9/1988 | Draplin et al. |
| 5,364,151 A | * | 11/1994 | Yurasits ................... 296/65.09 |
| 5,398,995 A | | 3/1995 | Hurite |
| 5,927,808 A | | 7/1999 | Esker |
| 5,934,727 A | | 8/1999 | Storc et al. |
| 5,984,397 A | * | 11/1999 | Dawson et al. .......... 296/65.09 |
| 6,012,771 A | | 1/2000 | Shea |
| 6,116,677 A | * | 9/2000 | Gac et al. ................ 296/65.16 |
| 6,260,916 B1 | * | 7/2001 | Hunt ..................... 296/190.11 |
| 6,276,751 B1 | * | 8/2001 | Ikarashi et al. ........ 296/190.11 |
| 6,398,291 B1 | * | 6/2002 | Reusswig et al. ........ 296/186.4 |
| 6,481,772 B1 | * | 11/2002 | Tenn ....................... 296/26.11 |
| 6,540,279 B1 | * | 4/2003 | Bargiel ..................... 296/65.05 |
| 2001/0030448 A1 | * | 10/2001 | Wilson .................. 296/190.11 |

* cited by examiner

*Primary Examiner*—Patricia L. Engle
(74) *Attorney, Agent, or Firm*—Foley & Larnder LLP (57) ABSTRACT

A seating and cargo system (50) for a vehicle (10) is disclosed having a generally horizontal floor (16) and one or more generally vertical frame members (18). A panel (20) is mounted transverse to a longitudinal axis of the vehicle (10) and pivotally coupled to the frame members (18). A seat back (52) is coupled to the panel (20) and has a lower end engaging a seat bottom (54). An optimal support member (70) is coupled to the seat bottom (54) and engages the floor section (16) of the vehicle (10) and another support member (62) is coupled to the lower end of the seat back (52) and to the bottom portion of the panel (20).

44 Claims, 5 Drawing Sheets

SEATING AND CARGO SYSTEM FOR A VEHICLE

FIELD OF THE INVENTION

The present invention relates to a seating and cargo system for a vehicle. More particularly the present invention relates to a seating system adaptable for use in a seating application and a cargo storage application in a vehicle with a mid-gate.

CROSS-REFERENCE TO RELATED APPLICATIONS

U.S. Provisional Patent Application 60/305,982 titled "Vehicle Seating System" filed Jul. 17, 2001; and U.S. patent application Ser. No. 09/939,189 titled "Seating and cargo System for a Vehicle" filed Aug. 24, 2001.

BACKGROUND

The following patents and/or patent applications are hereby incorporated by reference: U.S. Pat. No. 6,015,071 titled "Vehicle Storage Divider" issued Jan. 18, 2000; U.S. Pat. No. 6,050,202 titled "Storage Divider Shelf" issued Apr. 18, 2001. It is well-known to provide seats in vehicles for accommodating the comfort of vehicle passengers and the spatial requirements for cargo storage. The known seats are typically movable in different directions for improving the comfort of the vehicle passengers and for transforming the seats into a cargo storage position. Such seats are commonly used in a front portion of the vehicle for an operator and a front passenger, and additionally include seats in one or more rows for passengers in the non-first row and/or rear of the vehicle. Such non-first row and/or seats may fold into a vertical or horizontal storage position for converting passenger space into cargo storage space. Such seating systems also includes conventional and integrated safety belt system having one or more anchor points attached to the seat, which requires that the seat have sufficient structural strength to withstand the loading applied to the safety belts during collisions. The known or non-first row rear seating systems also include passenger safety belts having one or more anchor points attached to the floor or side of the vehicle that require separate assembly steps during vehicle construction.

It is also known in vehicles such as pickup trucks and other sport or utility vehicles to provide a "structural" panel forming a part of the vehicle for separating a passenger cabin portion of the vehicle from a cargo storage portion of the vehicle. Such known panels may be moveable for folding the panel into a storage or other use position to create an opening communicating between the cargo storage portion and the passenger cabin for increasing the total cargo storage space to include a portion of the passenger cabin.

There is an increasing demand for vehicles having improved cargo storage management systems combined with increased passenger capacity. This demand must be balanced with the need to maintain or reduce overall size, weight, cost, and assembly time and complexity of the vehicle. It would be advantageous to provide an improved seating system for a vehicle of the type having a folding panel, such as a mid-gate or tail-gate for a pickup truck, and rear seating capability. In such a seating system, it would be advantageous to provide a seat back portion having an adjustable inclination to improve passenger comfort when the panel is used in the seating position. It would also be advantageous to provide such a seating system having improved available cargo storage and passenger seating space. It would be further advantageous to provide a seating system that will further increase the available cargo storage space options to include at least a first cargo storage position where the panel is vertically positioned and a second cargo storage position where the panel is horizontally positioned. It would also be further advantageous to provide a seating system in which passenger safety belts are provided independent of the seat to reduce the size and weight of the seat structures, to reduce assembly time and complexity. Further, it would be beneficial to have a system that takes advantage of the structural strength of the mid-gate panel.

Therefore, it would be desirable to provide a seating and cargo system for a vehicle having any one or more of these or other advantageous features and overcoming the problems wherever in the known seating system.

SUMMARY OF THE INVENTION

The present invention relates to a seating and cargo system for a vehicle having a longitudinal axis and a generally horizontal floor section and one or more generally vertical frame members extending upward from opposite lateral sides of the floor section. The system includes a panel having a top portion and a bottom portion where the panel is oriented transverse to the longitudinal axis of the vehicle and is pivotally or otherwise coupled to the frame members. The system further includes a seat back having an upper end and a lower end and the seat back is coupled to the panel. The system further includes a seat bottom having a front end and a rear end, the rear end operably engaging the lower end of the seat back. A first support member may be coupled to the seat bottom to operably engage the floor section of the vehicle, and a second support member is coupled to the seat back and to the panel.

The present invention also relates to a seating and cargo system for a vehicle including a means for pivotally coupling a seat back to a panel for movement of the seat back between a seat back use position and a seat back storage position, a means for coupling a seat bottom to the seat back for movement of the seat bottom between a seat bottom use position and a seat bottom storage position, and a means for pivotally coupling the panel to the vehicle for selective movement of the panel between a generally vertical position and a generally horizontal cargo storage position when the seat bottom is in the seat bottom storage position and the seat back is in the seat back storage position.

The present invention further relates to a method for providing a seating system for a vehicle, the seating system is movable between a seating position and a cargo storage position. This method includes coupling a seat back to a panel for movement of the seat back between a seat back use position and a seat back storage position, coupling a seat bottom to the seat back for movement of the seat bottom between a seat bottom use position and a seat bottom storage position; moving the seat bottom from a seat bottom use position to a seat bottom storage position, moving the seat back from a seat back use position to a seat back storage position, coupling the panel to one or more frame portions of the vehicle, and selectively moving the panel between the seating position and the cargo storage position when the seat bottom is in the seat bottom storage position and the seat back is in the seat back storage position. It is also possible to have the panel provide a structural load path for the seat belt and shoulder belt loads such that the seat bottom and seat back do not need to carry these loads which removes the redundancy associated with an integrated safety seat being connected to panel.

The present invention further relates to a seating system that can be partially or completely contained within a panel of a vehicle. More particularly, the invention of the present relates to a seat that can be folded and completely contained within a mid-gate of a vehicle such that the seat can be folded and contained within the mid-gate and the mid-gate can be folded such that the cargo storage area of the vehicle can be extended into the cabin.

DETAILED DESCRIPTION OF THE PREFERRED EMBODIMENTS

Figure 1A:
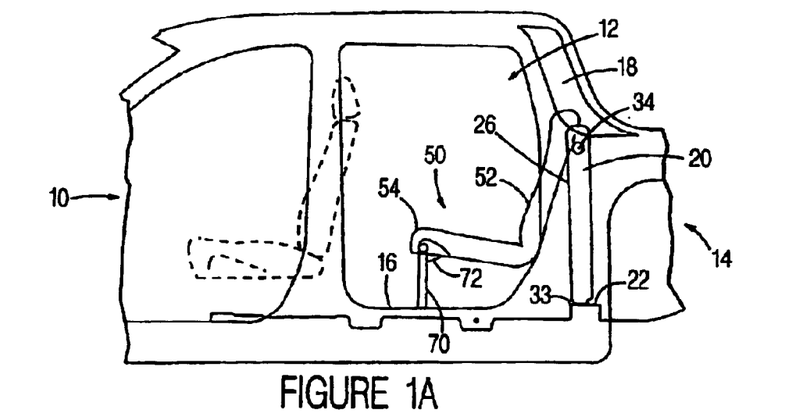
FIG. 1A is a side view of a seating and cargo system for a vehicle according to the present invention—in a seating position according to an exemplary embodiment.
Figure 1B:
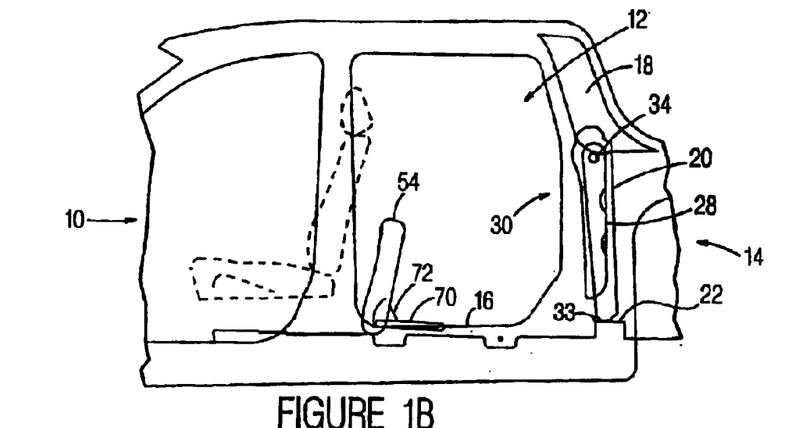
FIG. 1B is a side view of a seating and cargo system for a vehicle according to the present invention in a first cargo storage position according to an exemplary embodiment.
Figure 1C:
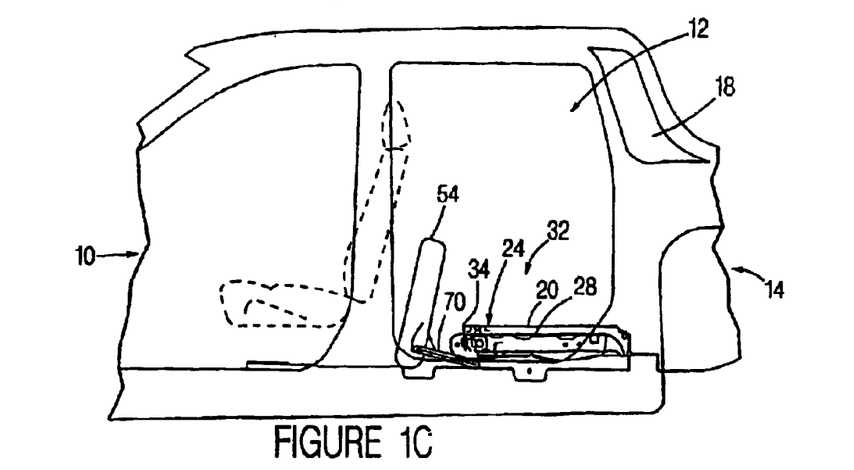
FIG. 1C is a side view of a seating and cargo system for a vehicle according to the present invention in a second cargo storage position according to an exemplary embodiment.

Referring generally to all FIGS. and particularly to FIGS. 1A–1C, a seating and cargo system for a vehicle is shown according to an exemplary embodiment. A vehicle 10 includes a passenger cabin 12 and a cargo storage space 14 separated by a panel 20 (such as a mid-gate, wall, divider, etc.) which is well known such as in a pick-up truck. Vehicle 10 further includes a lower, generally horizontal chassis base structure or floor section 16 having generally vertical frame members 18 (such as walls, panels, sides, columns, A pillars, B pillars, C pillars, D pillars, or other structural elements) extending upward from both lateral sides of floor section 16. Floor section 16 may have a variety of contours and shapes such as cross member or ledge 22 for accommodating the mounting or positioning of the vehicle components. In a preferred embodiment, panel 20 is made of sheet metal, but may be made of other structural materials (such as high-strength, impact-resistant plastic or polymer) and may provide lateral or torsional structural support to the vehicle. Panel 20 preferably includes a generally planar rear surface 24 facing cargo storage space 14 that may have built-in cargo storage management devices (not shown) such as containers, hooks, latches, straps, tie-downs, netting, etc.) such as described in U.S. Pat. No. 6,015,071 titled "Vehicle Storage Divider" issued Jan. 18, 2000 and U.S. Pat. No. 6,050,202 titled "Storage Divider Shelf" issued Apr. 18, 2001, the disclosure of which is incorporated by reference herein. Panel 20 may also include a generally planar front surface 26 facing the passenger cabin 12. In a particularly preferred embodiment of the present invention, front surface 26 includes a recessed portion 28 configured to at least partially receive a seat back portion that will be further described. Panel 20 is pivotally coupled (e.g. by hinges, pin joints, ball-and-socket connectors or any other appropriate device, etc.) to vehicle 10 to allow panel 20 to move between an upright position 30 and a stowed position 32. In the upright position, panel 20 provides physical separation (such as a barrier, partition or divider) between passenger cabin 12 and cargo storage space 14. In the stowed position 32 (shown in FIG. 1c), the physical separation is removed to provide access and communication between passenger cabin 12 and cargo storage space 14 so that a portion of passenger cabin 12 may be used in conjunction with cargo storage space 14 to provide additional cargo storage capacity when there is not sufficient space in storage space 14 when the panel 20 is in the upright position.

In a preferred embodiment, panel 20 has a bottom end pivotally coupled by one or more hinges 33 to ledge 22 or to floor section 16, but alternatively may be coupled by pin joints co-acting with vertical frame members 18. The upper portion of panel 20 may be selectively, releasably coupled to any suitable portion of vehicle 10 (such as vertical frame members 18) using any type of traditional latch mechanism as is well known.

In a preferred embodiment vehicle 10 also includes upper or shoulder anchors 34 and lower or buckle anchors 36 (such as brackets, holders, isofix devices, etc.) for anchoring conventional passenger safety belts or restraints (not shown)

in a manner that transfers the forces applied to the restraints directly to a structural portion of vehicle 10 independent of any seating elements in the vehicle. In a particularly preferred embodiment, lower anchors 36 are provided on each side of the seat and are attached to panel 20 preferably located near hinges 33 located on each lateral side and the center of panel 20. Alternatively, lower anchor 36 may be attached to ledge 22 (not shown), vertical frame members 18, or to an isofix-type device coupled to panel 20. Shoulder anchor 34 is preferably attached to the upper portion of panel 20 proximate the latch mechanism, but may be attached to any other structural portion of the vehicle suitable for providing support to a shoulder passenger safety restraint.

Figure 2A:
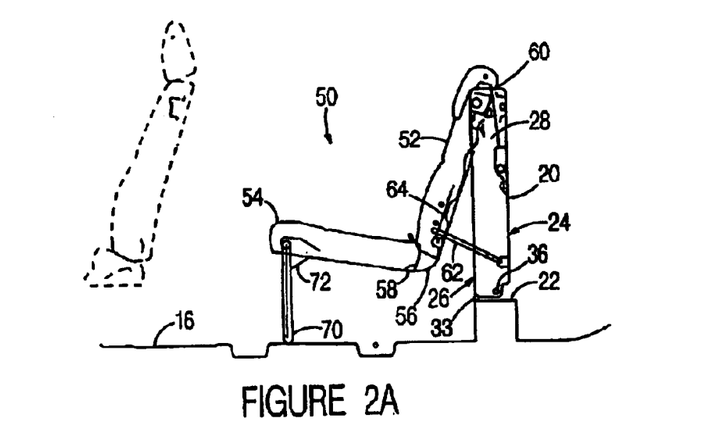
FIG. 2A is a side view of a seating and cargo system for a vehicle according to the present invention in a seating position according to an exemplary embodiment.
Figure 2B:
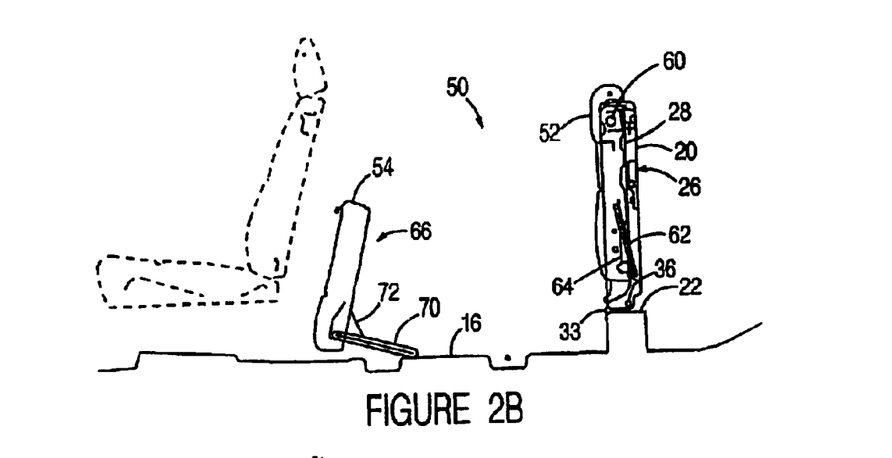
FIG. 2B is a side view of a seating and cargo system for a vehicle according to the present invention in a first cargo storage position according to an exemplary embodiment.
Figure 2C:
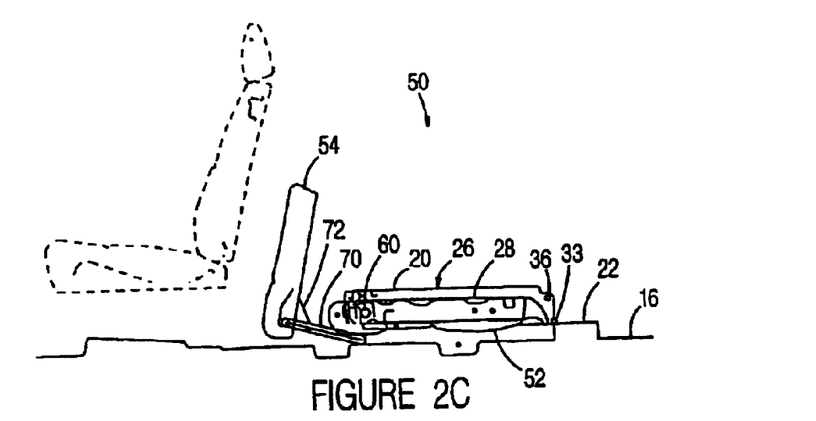
FIG. 2C is a side view of a seating and cargo system for a vehicle according to the present invention in a second cargo storage position according to an exemplary embodiment.

Referring to FIGS. 2A–2C, a seating system (FIGS. 1A–1C) cooperating with the vehicle 10 and panel 20 are shown according to an exemplary embodiment. Seating system 50 includes a seat back 52 and a seat bottom 54. Seat back 52 has a lower end selectively and removably coupled to a rear portion of seat bottom 54 by a shelf 56 having a lip 58 for co-acting with a projection (not shown) on the rear end of seat bottom 54 to allow seat bottom 54 to be released and moved to a forward tumble position to increase cargo storage space within passenger cabin 12. Alternatively, the seat bottom and the seat back may be releasably coupled using any conventional connection device.

Referring to FIG. 2A, according to a preferred embodiment, seat back 52 has an upper end pivotally coupled near a top portion of panel 20 at a pivot point 60. A support 62 (such as an arm, brace, link or any other appropriate member.) has a first end pivotally coupled near a bottom portion of panel 20 and a second end slidably coupled on a track 64 near a lower end of seat back 52 to secure the position of the seat back. The second end of support 62 may be moved along track 64 to adjust the angle of inclination of seat back 52 to provide passenger comfort, and may be releasably locked at various angles by engaging the second end of support 52 into any one of a plurality of detents (not shown) or other conventional stop-features configured in track 64. Alternatively, the pivot and track connections for the support may be reversed so that the support pivots on the seat back 52 and slides along a track in the panel 20, or the support may engage suitably positioned apertures on the seat back 52 and panel 20 to provide secure positioning. As shown in FIG. 2B, seat back 52 may be moved to a stowed position to create a first cargo storage option to increase the available storage space within passenger cabin 12 by releasing seat bottom 54 from seat back 52 and rotating seat back 52 inward until it is partially or completely contained within recess 28 in panel 20. Support 62 is moved along track 64 to an uppermost end and secured in place by a detent or other suitable engagement between support 62 and track 64 to maintain seat back 52 in the recess 28 of the panel 20.

Referring further to FIGS. 2A–2C, seat bottom 54 has a support 70 (e.g. leg, column, link or other appropriate member.) having a first end pivotally coupled to seat bottom 54 and a second end releasably and pivotally coupled to floor section 16 using any conventional bracket and release mechanism appropriate to operate the seat. Seat bottom 54 is generally horizontal when coupled to seat back 52 in a seating position with support 70 in a generally vertical orientation providing structural support to seat bottom 54 to support the weight of a passenger.

When seat bottom 54 is moved to the forward tumble position 66 (as shown in FIG. 2B and FIG. 2C), support 70 pivots to a generally horizontal orientation along floor section 16 to provide minimal intrusion into the available cargo storage space.

Seat bottom 54 may be moved to forward tumble position 66 to increase the space available in the first cargo storage option, or may be removed entirely from the vehicle to maximize cargo storage space. A brace 72 (e.g. arm, link, etc.) may be provided to releasably couple between seat bottom 54 and support 70 to maintain seat bottom 54 in an upright position when seat bottom 54 is moved forward, or brace 72 may be released to allow seat bottom 54 to be rotated downward so that the underside of seat bottom 54 is in facing alignment with floor section 16. When seat bottom 54 is in forward tumble position 66 or removed entirely from vehicle 10, then panel 20 with seat back 52 in the recessed position may be pivoted forward to a generally horizontal position in close proximity to floor section 16 by releasing the latches on panel 20 to create a second cargo storage option where passenger cabin 12 is in open communication with cargo storage space 14. Panel 20 may be releasably latched in the forward position using any conventional latching mechanism.

In an alternative embodiment, the seat bottom 54 may have a recessed underside including built-in cargo storage management devices such as containers, tie-downs, straps, hooks, netting, etc. Such as those as described in the U.S. Pat. Nos. 6,015,071 and 6,050,202 patents. Seat bottom may also include a recessed handle for removing and transporting the seat bottom from the vehicle.

Figure 3:
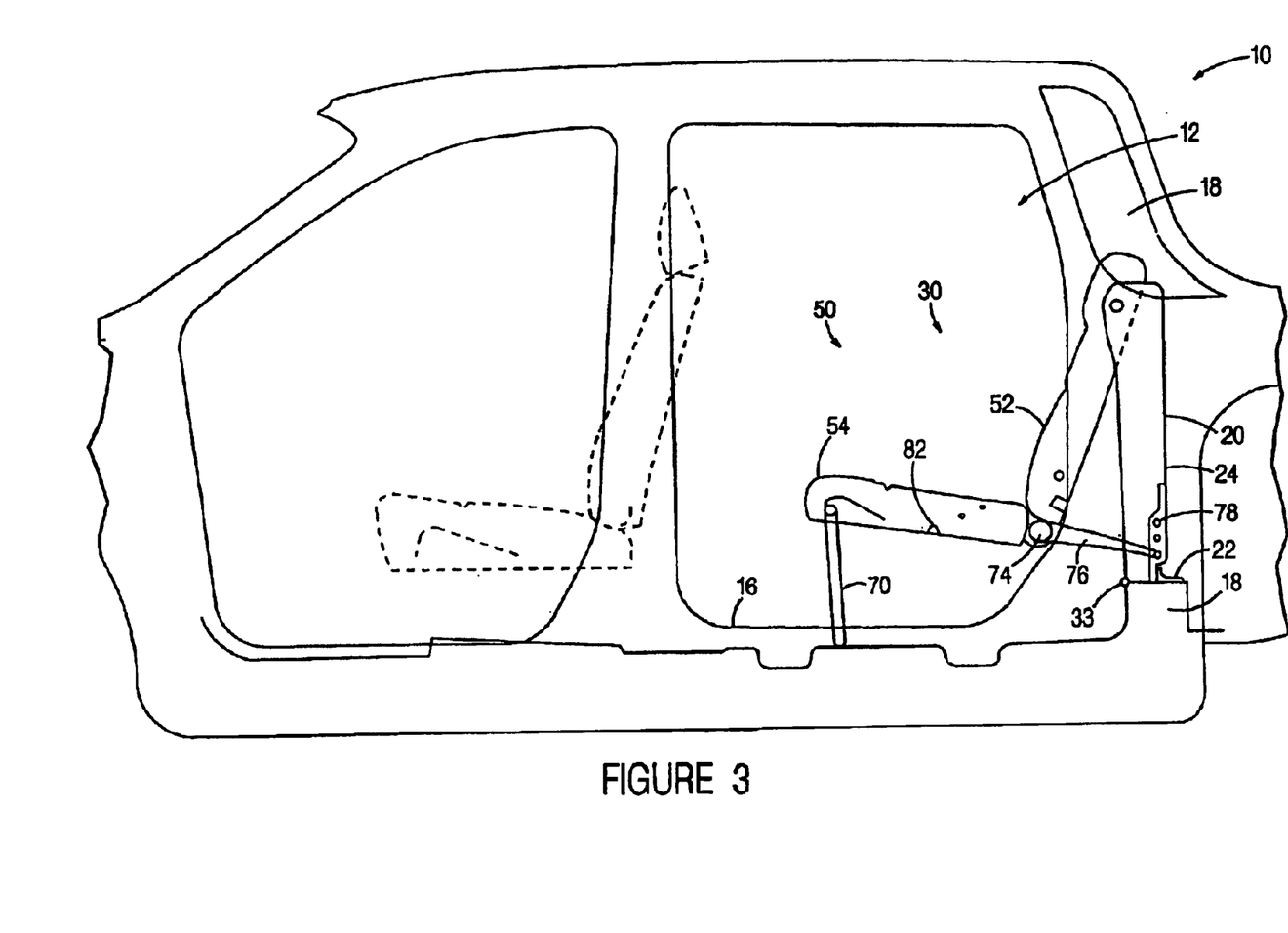
FIG. 3 is a side view of a seating and cargo system for a vehicle according to the present invention in a seating position according to another exemplary embodiment.
Figure 4A:
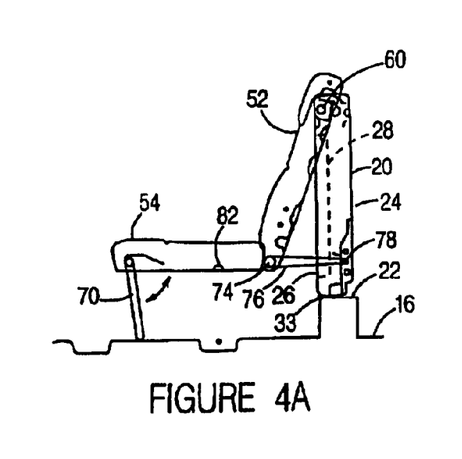
FIG. 4A is a side view of a seating and cargo system for a vehicle according to the present invention in a seating position according to another exemplary embodiment.

Referring to FIGS. 3 and 4A, a seating and cargo system for a vehicle 10 is shown according to an exemplary embodiment. A rear end of seat bottom 54 is pivotally coupled to a lower end of seat back 52 at a pivot axis 74 using any conventional pivoting mechanism such as a hinge, rotator sockets or other appropriate mechanism. A support 76 (such as an arm, brace, link, etc.) has a first end pivotally coupled to seat back 52 and seat bottom 54 near pivot axis 74. According to a preferred embodiment, panel 20 may include a plurality of receiving apertures 78 shown in a vertically aligned configuration, on a front surface or as shown on either side of panel 20 for adjustably receiving a co-acting projection (not shown) extending from a second end of support 76, to secure the lower portion of seat back 52 and adjust the angle of inclination of the seat back. Alternatively, the panel 20 may have a track with suitable detents for slidably receiving the second end of the support 76, or the panel may have a series of pegs oriented to engage a hook portion extending from the second end of the support 76. Seat bottom 54 has one or more supports 70 (e.g. a leg, column, link, etc.) having a first end pivotally coupled to seat bottom 54 for movement between preferably a generally or about zero (0) degree position where support 70 is oriented generally parallel to the plane of seat bottom 54 for use in a stowed position and a generally or about ninety (90) degree position where support 70 is oriented generally perpendicular to the plane of seat bottom for use in a seating position. Support 70 also has a second end adapted to engage floor section 16 to provide structural support to seat bottom 54 and passengers when the seat bottom is used for seating.

Figure 4B:
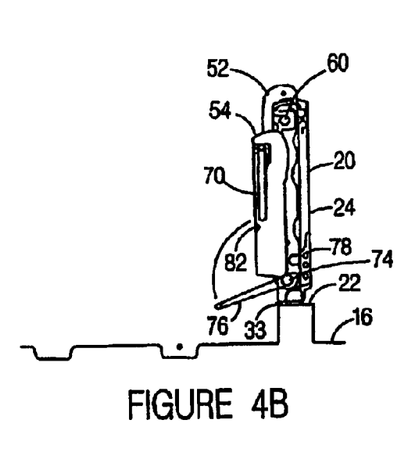
FIG. 4B is a side view of a seating and cargo system for a vehicle according to the present invention in a first cargo storage position according to another exemplary embodiment.
Figure 4C:
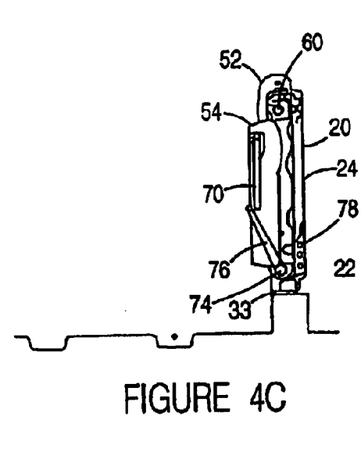
FIG. 4C is a side view of a seating and cargo system for a vehicle according to the present invention in a first cargo storage position according to another exemplary embodiment.

Referring to FIGS. 4B–4E, the seating system may be selectively moved to create one or more cargo storage options. Seat back 52 may be moved to a stowed position by releasing the second end of support 76 from panel 20 and pivoting seat back 52 into recess 28 in panel 20 and seat bottom 54 may be moved about pivot axis 74 into a stowed position in facing alignment with the front surface of seat back 52. The underside of seat bottom 54 includes a catch 82 (such as a snap-fit detent, peg, or other connection device) adapted to receive the second end of support 76 when seat back 52 and seat bottom 54 are in the stowed position. Seat bottom 54 may be secured to seat back 52 in the stowed position to create a first cargo storage option by rotating support 76 upward and securing the second end of support 76 to catch 82 as shown in FIGS. 4B and 4C. The first cargo storage option increases the available storage space within passenger cabin 12 while maintaining the physical separation between passenger cabin 12 and cargo storage space 14.

Figure 4D:
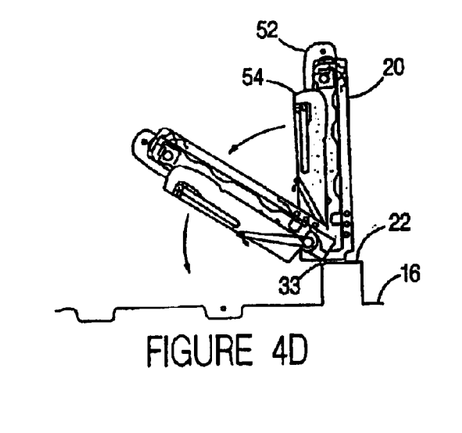
FIG. 4D is a side view of a seating and cargo system for a vehicle according to the present invention rotating to a second cargo storage position according to another exemplary embodiment.
Figure 4E:
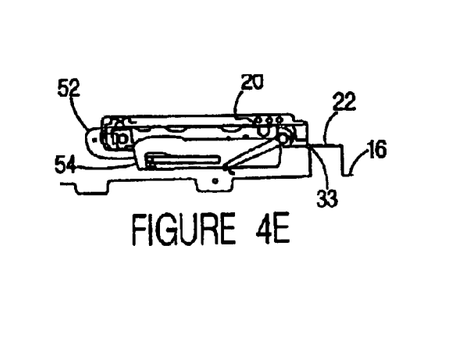
FIG. 4E is a side view of a seating and cargo system for a vehicle according to the present invention stowed in a second cargo storage position according to another exemplary embodiment.
Figure 5A:
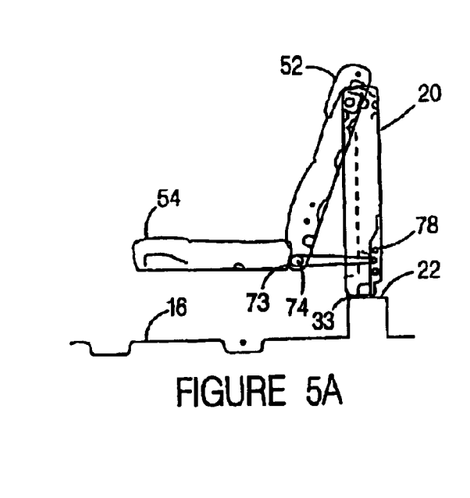
FIG. 5A is a side view of a seating and cargo system for a vehicle according to the present invention in a seating position according to a further exemplary embodiment.
Figure 5B:
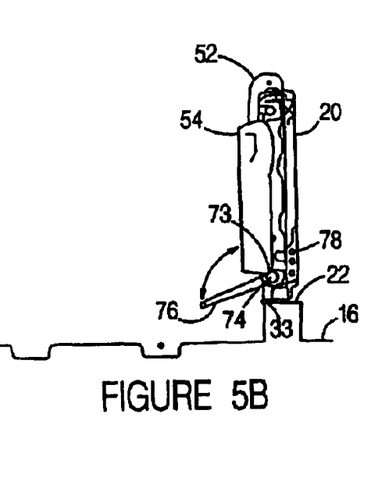
FIG. 5B is a side view of a seating and cargo system for a vehicle according to the present invention in a first cargo storage position according to a further exemplary embodiment.
Figure 5C:
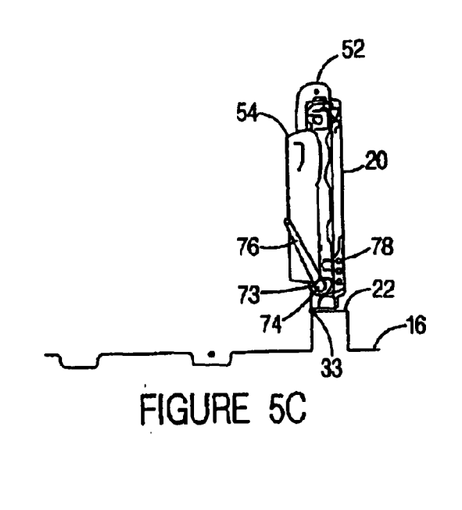
FIG. 5C is a side view of a seating and cargo system for a vehicle according to the present invention in a first cargo storage position according to a further exemplary embodiment.
Figure 5D:
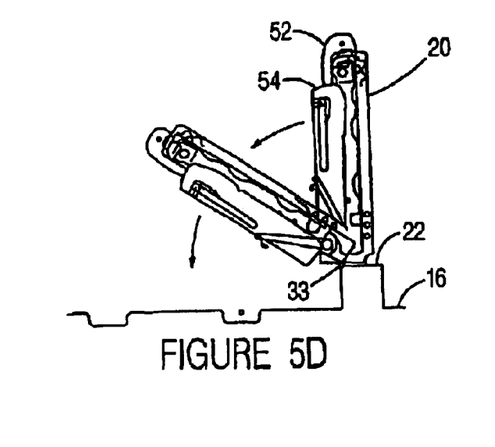
FIG. 5D is a side view of a seating and cargo system for a vehicle according to the present invention rotating to a second cargo storage position according to a further exemplary embodiment.
Figure 5E:
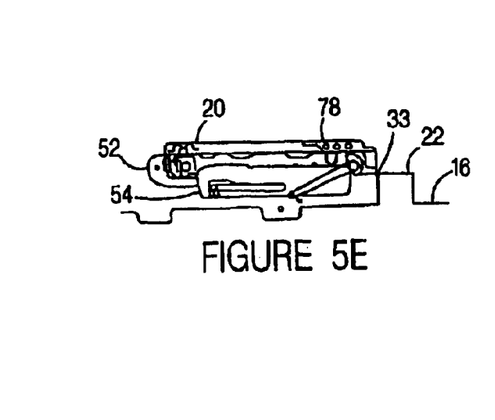
FIG. 5E is a side view of a seating and cargo system for a vehicle according to the present invention stowed in a second cargo storage position according to a further exemplary embodiment.

Referring to FIGS. 4D and 4E, the stowed seat bottom 54 and seat back 52 may be moved to create a second cargo storage option where the physical separation between passenger cabin 12 and cargo storage space 14 is removed to provide open access and communication between passenger cabin 12 and cargo storage space 14. Panel 20 with seat back 52 and seat bottom 54 in the stowed position may be moved forward into a generally horizontal position in facing alignment with floor section 16 by releasing the latches on panel 20 and rotating panel 20 toward the floor Section 16. Panel 20 with seat back 52 and seat bottom 54 in the stowed position may be releasably secured to floor section 16 by any conventional latch mechanism.

Referring to FIGS. 5A through 5E, a seating and cargo system for a vehicle 10 is shown according to an exemplary embodiment. A seat bottom 54 having no lower support leg has a rear end pivotally coupled by a pivot mechanism 73 (such as a conventional ratcheting mechanism, a gear-and-pawl device, etc. having the necessary strength to support the weight of a passenger) to a lower end of seat back 52 at a pivot axis 74 for adjustable rotation of seat bottom 54 in a pivot range between a stowed position where seat bottom 54 is moved upward into facing engagement with seat back 52, and a seating position where seat bottom 54 is moved to a generally horizontal position.

The seat bottom 54 may be selectively locked in any position relative to seat back 52 within the pivot range by pivot mechanism 73 to provide a comfortable seating surface for a passenger. Alternatively, the seat bottom 54 may be provided with one or more travel stop positions, such as a shear-pin or latch mounted on a lower portion of the seat back to engage the seat bottom 54 in the desired position. A support 76 (such as an arm, brace, link, etc.) has a first end pivotally coupled to seat back 52 and seat bottom 54 near pivot axis 74. Support 76 is preferably made of steel and sized to withstand the compressive forces created by the downward load of a passenger created when the passenger is restrained by the lap portion of a safety restraint during a frontal collision.

According to a preferred embodiment, panel 20 may include a plurality of receiving apertures 78 shown in a vertically aligned configuration, on a front surface or as shown on either side of panel 20 for adjustably receiving a co-acting projection (not shown) extending from a second end of support 76, to secure the lower portion of seat back 52 and adjust the angle of inclination of the seat back 52. Alternatively, the panel 20 may have a track with suitable detents for slidably receiving the second end of the support, or the panel may have a series of pegs oriented to engage a hook portion extending from the second end of the support 76.

In an alternative embodiment, a lightweight, narrow-profile seat back and seat bottom may comprise a tubular frame extending around the perimeter, or may alternatively be provided having a substantially U-shaped outline, having a mesh material stretched across, and secured to, the frame. A thin cushion (such as high-density foam or other resiliently complaint material) may be secured over the mesh for providing improved comfort. The frame portions on the rear end of the seat bottom and the lower end of the set back may be pivotally connected and configured to have co-acting portions for releasably locking the seat bottom to the seat back in either of a seating position or a stowed position.

In another alternative embodiment, the panel 20 with the seat bottom 54 and the seat back 52 in the stowed position may be removed from the vehicle 10 by providing a releasable pivot mechanism (such as spring-biased pins or other quick-release device) to provide still further additional cargo storage options.

The seating and cargo system according to the exemplary embodiments may be conveniently manufactured as an integral unit for installation in a vehicle during assembly as a single step, or may be offered to replace a conventional mid-gate in a vehicle as an after-market upgrade.

According to other exemplary embodiments, the seating and cargo system may be associated with any vehicle such as an automobile, truck, pickup, sport utility vehicle, recreation vehicles, farm or construction equipment, boats, airplanes, trains, etc. (i.e., any vehicle having both passenger seating and cargo storage). The seat back and seat bottom may be a single or "captain's" seat, a bench seat or may be separated into independent segments (such as a 50/50 split seat or a 60/40 split seat or any other desired ratio). The seat back may be pivotally coupled to the panel using any suitable pivot device such as a hinge, ball and socket, rotator coupling, pin joint or other connection for providing a pivoting coupling between the two objects. The supports may be coupled to the seat back, seat bottom and panel using any suitable attachment device for adjustably providing support in an seating position and moving to a stowed position to improve cargo storage capability. The recess in the panel may have any suitable shape and dimension necessary to accommodate storage and pivoting motion of the seat back, while maintaining suitable depth and providing a framework having the necessary structural strength and rigidity for use as part of the vehicle structure. The panel may have any overall size and shape necessary to engage the vehicle floor or frame members. The seat bottom and seat back may have any suitable size, shape, rigidity and material of construction appropriate for use as a seat and for movement to a stowed position. The seating and storage system of the present invention may also be adapted to vehicles having only a first row seating system. The panel may be separated into two segments and configured to be pivotally movable on only the segment corresponding to the front passenger seat of the vehicle.

It is important to note that the term "seating and cargo system" is intended to be a broad term and not a term of limitation. The term "seating and cargo system," as used in this disclosure, may include, without limitation: brackets, holders, trays, fixtures, bins, compartments, pockets, pouches, nets, straps, cords, tie-downs, hangers, and other items for storing or securing cargo.

It is further important to note that the construction and arrangement of the elements of the seating and cargo system as shown in the preferred and other exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, interchangeable relationships, use of materials, processes, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments unless expressly limited. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present invention as expressed in the appended claims.

What is claimed is:

1. A seating and cargo system for use in a vehicle, the vehicle having a longitudinal axis, a cabin portion, a cargo portion, a floor section and at least one frame member extending from the floor section, and a panel having a top portion and a bottom portion and adapted to be pivotally coupled to the vehicle, the seating and cargo system comprising:
    a recess provided in the panel;
    a seat back having an upper end and a lower end, the seat back adapted to be coupled to the panel so that the seat back is positionable at least partially within the recess;
    a seat bottom having a front end and a rear end, the rear end adapted to operably engage the lower end of the seat back; and
    a first support member coupled to the lower end of the seat back and adapted to be coupled to the panel.

2. The seating and cargo system of claim 1 wherein the panel is a mid-gate separating the cabin portion of the vehicle from the cargo portion of the vehicle, the seating and cargo system further comprising a second support member coupled to the seat bottom and adapted to operably engage the floor section of the vehicle.

3. The seating and cargo system of claim 2 wherein the seat back is adapted to couple to the recess of the mid-gate facing the cabin portion of the vehicle.

4. The seating and cargo system of claim 1 wherein the seat bottom and the seat back combine to form a non-first row seat.

5. The seating and cargo system of claim 2 wherein the upper end of the seat back is pivotally coupled to the top portion of the mid-gate and movable to create one or more angles of inclination when the seat back is in a seating position.

6. The seating and cargo system of claim 2 wherein the seat back is pivotally movable into a storage position at least partially within the recess of the mid-gate.

7. The seating and cargo system of claim 1 wherein the rear end of the seat bottom is removably coupled to the lower end of the seat back.

8. The seating and cargo system of claim 1 wherein the seat bottom is pivotally movable into facing alignment with the seat back.

9. The seating and cargo system of claim 2 wherein the second support member is pivotally coupled to the seat bottom and configured to fold against the seat bottom when the seat bottom and seat back are in a storage position.

10. The seating and cargo system of claim 1 wherein the first support member has a first end pivotally coupled to the lower end of the seat back.

11. The seating and cargo system of claim 2 wherein the mid-gate has a bottom portion having at least one receiver and the first support member has a second end adapted to releasably engage the receiver in the bottom portion of the mid-gate to adjust the angle of inclination of the seat back.

12. The seating and cargo system of claim 11 wherein the second end of the first support member is movable into releasable engagement with an underside of the seat bottom to secure the seat bottom in a storage position.

13. The seating and cargo system of claim 1 wherein the panel is coupled to the vehicle and movable to a storage position so that the panel is located in the cabin portion of the vehicle in a generally horizontal and facing engagement with the floor section when the seat back and the seat bottom are in a storage position.

14. The seating and cargo system of claim 4 wherein the non-first row seat is a bench seat.

15. The seating and cargo system of claim 4 wherein the non-first row seat is a 50/50 split seat.

16. The seating and cargo system of claim 4 wherein the non-first row seat is a 60/40 split.

17. The seating and cargo system of claim 1 wherein the vehicle is a pickup truck.

18. The seating and cargo system of claim 1 wherein the vehicle is a sport utility vehicle.

19. The seating and cargo system of claim 1 further comprising a vehicle passenger safety belt anchored to at least one of the panel, the frame member, and the floor section independently of the seat bottom and the seat back.

20. The seating and cargo system of claim 1 wherein the rear end of the seat bottom releasably engages the lower end of the seat back.

21. The seating and cargo system of claim 20 wherein the seat bottom is movable into a forward tumble position.

22. The seating and cargo system of claim 2 wherein the second support member is pivotally coupled to the seat bottom and releasably coupled to the floor section to permit rotational movement of the seat bottom to a forward tumble position.

23. The seating and cargo system of claim 1 wherein the seat bottom is selectively removable from the vehicle.

24. The seating and cargo system of claim 1 wherein the first support member has a first end slidably coupled to the lower end of the seat back to adjust the angle of inclination of the seat back.

25. The seating and cargo system of claim 24 wherein the first support member has a second end pivotally coupled to the bottom portion of the panel.

26. The seating and cargo system of claim 2 wherein the bottom portion of the mid-gate is adapted to be pivotally coupled to the vehicle.

27. The seating and cargo system of claim 26 wherein the mid-gate is movable into the cabin portion of the vehicle and in a generally horizontal and facing engagement with the floor section when the seat back is in the storage position.

28. A seating and cargo system for a vehicle, comprising:
    means for pivotally coupling a seat back at least partially within a recess in a panel for movement of the seat back between a seat back use position and a seat back storage position;
    means for coupling a seat bottom to the seat back for movement of the seat bottom between a seat bottom use position and a seat bottom storage position; and
    means for pivotally coupling the panel to one or more frame portions of the vehicle for selective movement of the panel between a generally vertical access position and a generally horizontal cargo storage position when the seat bottom is in the seat bottom storage position and the seat back is in the seat back storage position.

29. The seating and cargo system of claim 28 further comprising means for positioning the seat back at one or more angles of inclination when the seat back is in the seat back use position.

30. The seating and cargo system of claim 28 wherein the seat bottom is pivotal relative to the seat back for facing engagement with the seat back.

31. The seating and cargo system of claim 30 further comprising means to secure the seat bottom in facing engagement with the seat back.

32. The seating and cargo system of claim 28 wherein the seat bottom storage position is a forward tumble position.

33. The seating and cargo system of claim 32, further comprising means to selectively remove the seat bottom from the vehicle when the seat bottom is in the forward tumble position.

34. A method for providing a seating system for a vehicle that is movable between a seating position and a cargo storage position, the method comprising:

coupling a seat back at least partially within a recessed portion of a panel for movement of the seat back between a seat back use position and a seat back storage position;

coupling a seat bottom to the seat back for movement of the seat bottom between a seat bottom use position and a seat bottom storage position;

coupling the panel to one or more frame portions of the vehicle; and configuring the panel for movement between the seating position and the cargo storage position when the seat bottom is in the seat bottom storage position and the seat back is in the seat back storage position.

35. The method of claim 34 further comprising positioning the seat back at one or more angles of inclination when the seat back is in the seat back use position.

36. The method of claim 34 wherein the seat back is at least partially contained in a recess on a cabin side of the panel when the seat back is in the seat back storage position.

37. The method of claim 34 further comprising securing the seat bottom in facing engagement to the seat back when the seat bottom is in the seat bottom storage position and the seat back is in the seat back storage position.

38. The method of claim 34 wherein the seat bottom storage position is a forward tumble position.

39. The method of claim 38 further comprising selectively removing the seat bottom from the vehicle when the seat bottom is moved to the forward tumble position.

40. The method of claim 34 further comprising providing one or more passenger safety belts adapted to attach to the vehicle independently of the seat back and the seat bottom.

41. A seating and divider system for use in a vehicle having a floor and at least one structural member, the seating and divider system comprising:

a panel adapted to be pivotally mounted to the vehicle and releasably coupled to the structural member for movement between a generally vertical position and a generally horizontal position;

a seat back pivotally mounted to the panel for movement between a seating position and a stowed position;

a seat bottom pivotally mounted to the seat back for movement between the seating position and the stowed position;

a support having a first end operably engaging the seat back and a second end operably engaging the panel and configured to adjust the angle of inclination of the seat back; and one or more passenger safety restraint devices coupled to the panel.

42. The seating and divider system of claim 41 wherein the support is pivotal between a support position and a retainer position for the seat bottom.

43. The seating and divider system of claim 41 wherein the panel includes a recess and the seat back is at least partially contained within the recess.

44. The seating and divider system of claim 41 wherein the passenger safety restraints are coupled to the panel independently of the seat back and the seat bottom.

* * * * *